Figure 1:
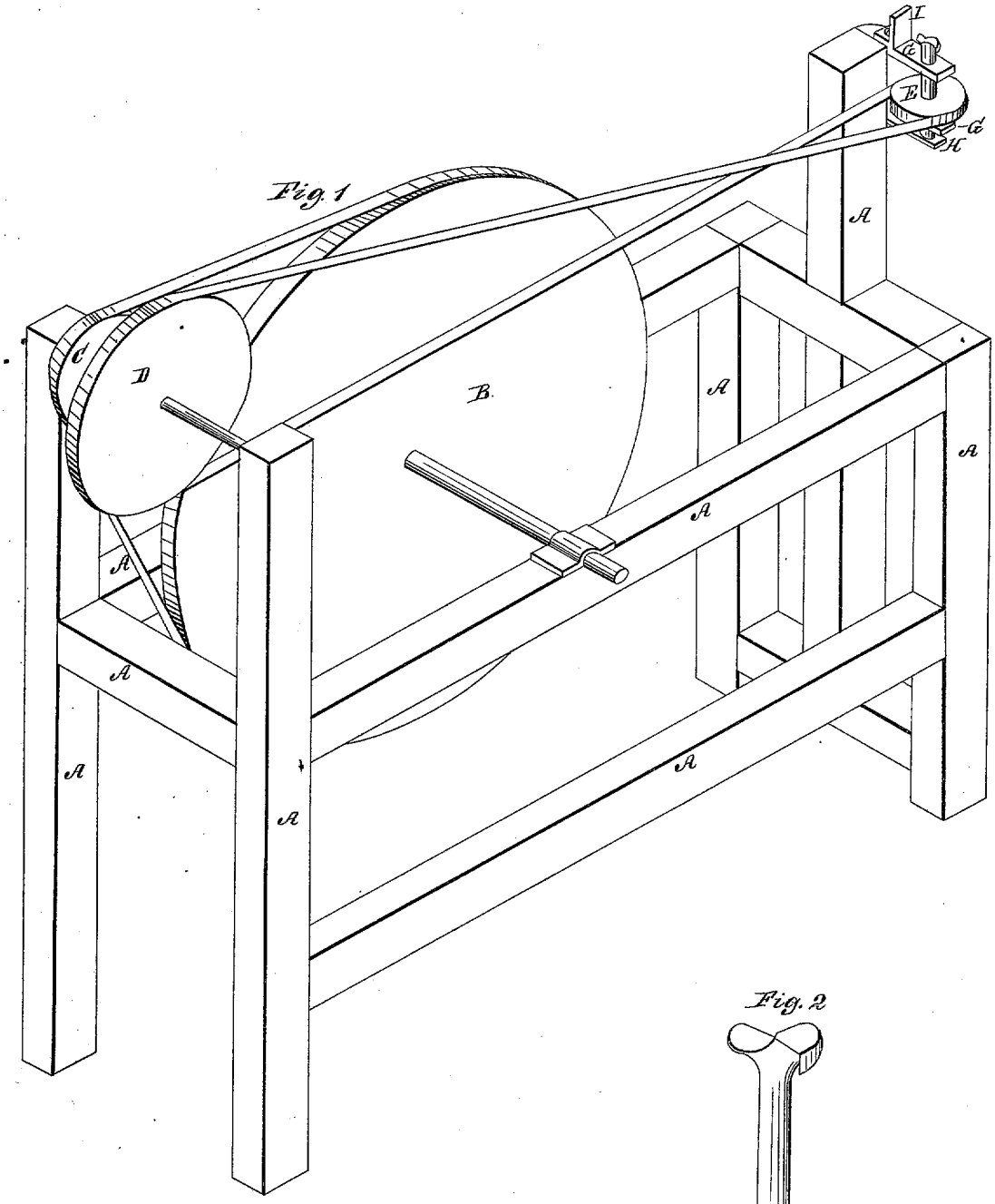
Figure 2:
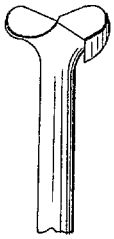

7627X

D. D. Hanson,

Wood Molding Machine.

Patented June 29, 1833.

AM. PHOTO-LITHO. CO. N.Y. (OSBORNE'S PROCESS.)

7627X

David D. Hanson of Ware in State of New Hampshire

Letters Patent

The schedule referred to in these Letters Patent and making part of the same, containing a description in the words of the said David D. Hanson himself of his improvement called the grooving Machine —

This Machine operates in an oblong frame one foot wide and three feet long by means of pulleys and bands, The frame consists of two foot pieces twenty inches long, five posts, two of which are two feet eight inches high, two of one foot eight inches with a cap-piece, and the other standing centrally between the two posts last mentioned about three feet high, halved on the cap-piece and framed into the foot-piece below, one girt crosswise between the two highest posts on a level with the cap piece upon the other posts, and four girts lengthwise, the two lower of which are framed into the posts about four or five inches above the foot-pieces, the other about one foot higher, all these timbers may be two inches square, The principal pulley or wheel is twenty four inches in diameter, and is moved by a crank, the shaft of which rests upon the two upper long girts of the frame, three or four inches from the middle and secured by caps, is placed about one inch or more within one of the girts, and about five or six inches within the other the said pulley being about one or one and a half inch in thickness. Two other pulleys the one four the other eight inches, in diameter, are fixed upon a revolving shaft, the ends or gudgeons of which are inserted into the two longest posts about one inch and a half from the top, The smallest of these, the four inch pulley is placed in a direct line with the largest pulley or wheel first mentioned, about two inches or more from which the eight inch pulley is placed upon the same revolving shaft.—On the outside of the fifth or 7627X June 29, 1833 or centre posts, being the highest post in the aforesaid frame is affixed the spiral cutter or groover and stands perpendicularly, the cutter with its arbor or spindle is made of cast steel. is five or six inches long and about three sixteenths of an inch in diameter. The diameter may however be varied according to the width of the groove intended to be cut; — Upon the spindle is a pulley or whirl of wood about three inches in diameter. This spindle, or arbor of the cutter, is fixed in a frame of cast iron or brass formed of a plate of about five inches in length, two in width, and one [illegible] an inch thick fastened on to the outside of the posts by screws;- extending from which at right angles at the top and near the bottom, are two arms the upper of which is two inches long, one inch wide five eighths thick, and rounded on the top; the lower two inches and five eighths long, one inch wide and one fourth of an inch thick through holes in both of which, near the outer ends, the perpendicular spindle or arbor of the cutter passes and revolves. under the lower arm is affixed and secured by screws a bearing of iron or brass through which the gudgeons of the spindle at the lower end passes secured underneath the bearing by a washer and pin to prevent its rising, and on the top by the shoulder of the spindle to prevent its lowering, - By means of the screws which hold it in its place, the bearing may be raised or lowered to suit the depth of the groove intended to be cut On the upper arm is fixed a moveable guage, to regulate the thickness of the moulding ——— The cutter or groover is operated by means of two leather bands applied to the pulleys, one extending from the large or twenty four inch to the four inch pulley, and enclosing these two, and the other from the eight inch to the three inch pulley or whirl upon the arbor of the cutter. The eight inch pulley moving perpen-dicularly, and the whirl horizontally, the band enclosing them is necessarily twisted; and in order that it may not slide or run off of the whirl, the whirl must be so placed 7627x June 29, 1833 upon its shaft (the arbor of the cutter) that the centre of its plane
or thickness shall be exactly level with the highest part of the periphe
ry of the eight inch pulley, and the eight inch pully must be
so placed upon its shaft, that the periphery of the whirl opposite
to the crank of the large or 24 - inch wheel shall be in a
direct line with the centre of the plane of the eight inch whal To use the cutter the material in which the groove is to
be cut must be held in the hands immediately over and upon
the cutter, pressing it at the same time against the gauge
and pushing the material forward by the hand as the groover
cuts - somewhat in the manner the material is moved when
applied to a circular saw, conforming the groove to the straight
or curved edge or side of the material in which it is cut The cutter or groover, made of cast steel has two spiral
edges, winding half round, with an edge at the top, the length
of its diameter made crotched, or resembling in form a
swallow tail, cutting at the same time with its upper
and lateral edges The invention which I claim, is the spiral cutter or
groover, and the combination and arrangement of the ma-
chinery to effect its use, - By the use of this cutter groo-
-ving of any kind may be done with great expedition with
at least seven times the rapidity that it is usually done
with a chisel, or in any other way heretofore known or
practised, It may be operated by hand, by water, steam,
or any other power, Witnesses
Alb. Cady }
A. Wifford }

David L. Hanson

Ex.d
Chf 1080 h.b.